US007079019B1

(12) United States Patent
Ruggiero

(10) Patent No.: US 7,079,019 B1
(45) Date of Patent: Jul. 18, 2006

(54) REGISTRATION AND INSPECTION ALARM APPARATUS

(76) Inventor: Kenneth Ruggiero, 1745 74th St., Brooklyn, NY (US) 11204

( * ) Notice: Subject to any disclaimer, the term of this patent is extended or adjusted under 35 U.S.C. 154(b) by 143 days.

(21) Appl. No.: 10/909,773

(22) Filed: Aug. 2, 2004

(51) Int. Cl.
*B60Q 1/00* (2006.01)

(52) U.S. Cl. ................ 340/457.4; 340/457; 340/309.7; 340/309.8

(58) Field of Classification Search ................ 340/457, 340/457.4, 309.16, 309.3, 309.4, 309.5, 309.7, 340/309.8, 309.9; 368/10, 107; 320/113, 320/132; 705/3
See application file for complete search history.

(56) References Cited

U.S. PATENT DOCUMENTS

| | | | | |
|---|---|---|---|---|
| 3,940,735 | A | 2/1976 | Kronenberg | 340/457.4 |
| 4,031,363 | A | 6/1977 | Freeman et al. | 340/457.4 |
| 4,404,641 | A | 9/1983 | Bazarnik | 340/457.4 |
| 4,533,900 | A | 8/1985 | Muhlberger et al. | 340/457.4 |
| 4,630,027 | A | 12/1986 | Muhlberger et al. | 340/457.4 |
| 4,868,800 | A | 9/1989 | Arber | 368/29 |
| 4,988,987 | A * | 1/1991 | Barrett et al. | 340/5.28 |
| 5,554,967 | A * | 9/1996 | Cook et al. | 340/309.7 |
| 5,612,869 | A * | 3/1997 | Letzt et al. | 705/3 |
| 5,910,931 | A | 6/1999 | Pettyjohn | 368/251 |
| 5,929,601 | A * | 7/1999 | Kaib et al. | 320/113 |
| 6,026,060 | A | 2/2000 | Rothschild et al. | 368/10 |
| 6,091,326 | A | 7/2000 | Castellano | 340/457.4 |
| 6,169,387 | B1 * | 1/2001 | Kaib | 320/132 |
| 6,337,836 | B1 * | 1/2002 | Eidelson | 368/10 |
| 6,397,104 | B1 * | 5/2002 | Miller et al. | 607/5 |
| 6,721,685 | B1 | 4/2004 | Kodama | 340/309.9 |

FOREIGN PATENT DOCUMENTS

| | | |
|---|---|---|
| WO | WO202/093509 | 11/2002 |

* cited by examiner

*Primary Examiner*—Van T. Trieu
(74) *Attorney, Agent, or Firm*—Michael I Kroll

(57) ABSTRACT

An alarm mechanism includes a first programming for programming an expiration date signifying that an event must be performed. A second programming is included for programming a notification date for notifying a user that the event must be performed. A display device displays the expiration date thereon. A timing mechanism produces an actual date and is connected to the first and second programming. A processor compares the actual date produced by the timing mechanism with each of the expiration date and notification date. An alerting device alerts a user that at least one of the expiration date and the notification date is greater than or equal to the actual date. Upon the at least one of the expiration date and the notification date is greater than or equal to the actual date, the processor causes the alerting device to emit an alert thereby notifying the user that the event must be performed.

19 Claims, 12 Drawing Sheets

REGISTRATION AND INSPECTION ALARM APPARATUS

BACKGROUND OF THE INVENTION

1. Field of the Invention

The present invention relates an alarm mechanism, and more specifically, to a vehicle alarm for selectively notifying a user that the motor vehicle registration renewal is upcoming and that the yearly motor vehicle inspection is upcoming. The notification can be a flashing light or an audio tone or message emitted by the alarm mechanism or any combination thereof, which may additionally include a subscription phone notification service from a service bureau. The alarm mechanism is comprised of a housing that may vary in shape having a front surface and a back surface. The back surface may include a fastening element whereby the device can be fixedly or removable attached to a structure, such as an adhesive element for attachment to a motor vehicle or a magnetic element for attachment to a magnetic material.

The front surface contains a display area with means for setting various timers and clock display. In the preferred embodiment, the current date and time is set using the provided buttons. There are also buttons for setting the expiration date for the vehicle registration that is displayed in the registration display window and buttons for setting the vehicle inspection expiration date that is displayed in the inspection display window. Once the expiration of either approached a predetermined time period relative to the current date, such as a week or ten days, the alarm mechanism will engage the notification system.

2. Description of the Prior Art

Numerous other alarm mechanisms exist in the prior art. Typical of these are U.S. patent Nos. U.S. Pat. Nos. 3,940,735; 4,031,363; 4,404,641; 4,533,900; 4,630,027; 4,868,800; 5,910,931; 6,026,060; 6,091,326; 6,721,685 and World Patent Number 02/0935509. While these keyboards may be suitable for the purposes for which they were designed, they would not be as suitable for the purposes of the present invention, as hereinafter described.

U.S. Pat. No. 3,940,735

Inventor: Hartmut Kronenberg

Issued: Feb. 24, 1976

Device for indicating when a vehicle has travelled a predetermined distance, calling for inspection or servicing of some part of the vehicle. An electrochemical indicator integrates a signal indicative of the vehicle speed to provide an output indication.

U.S. Pat. No. 4,630,027

Inventor: Heinz Muhlberger et al.

Issued: Dec. 16, 1986

A service-interval display for motor vehicles, which generates a signal when a limiting parameter value is reached. Total fuel consumption serves as the basic parameter instead of the distance travelled, previously employed. Other parameters may serve to modify the generation of the signal to cause an earlier or later warning to be displayed.

U.S. Pat. No. 6,091,326

Inventor: Antonio Castellano

Issued: Jul. 18, 2000

A device for reminding a driver of a vehicle of the expiration date of the associated inspection sticker. The device includes a housing, a microprocessor, a LCD, a calendar chip for generating a date, a clock chip for generating a time, an alarm chip the provides a visible alarm and an audible alarm, a select button that selects either the clock chip, the calendar chip, or the alarm chip, and a value button that sets either the clock chip, the calendar chip, or the alarm chip that was selected by the select button. The device further includes a piece of two-sided tape that is attached to the rear wall of the housing and attaches the housing to the windshield of the vehicle, behind the inspection sticker. The audible and visible alarms have duty cycles with frequencies and durations that are selected by a menu brought up on the LCD display by the select button and set by the value button. The duty cycles are intermittent as opposed to constant for preventing drain on the battery. The alarm chip is set to activate at a predetermined time prior to the expiration date of the inspection sticker so as to remind the driver of the vehicle that the expiration date of the inspection sticker is approaching.

U.S. Pat. No. 4,031,363

Inventor: John D. Freeman et al.

Issued: Jun. 21, 1977

Apparatus capable normally of presentation of time in hours and minutes and upon command of other functions, such as miles before service is required and days before service is required. The apparatus includes at least one logic integrated circuit for providing required frequency division of various inputs, a storage for accumulating information received from the integrated circuit and for retaining the information over a period of time even though power to the circuit is interrupted, a power supply and a display for displaying information on demand.

U.S. Pat. No. 4,868,800

Inventor: Amihadar Arber

Issued: Sep. 19, 1989

An electronic advanced date warning system including a base having a front surface, a first member associated with the front surface for lighting selected date warning areas thereon, a second member associated with the front surface for lighting selected areas thereon corresponding to specific categories of events associated with the selected date warning areas of the first member, and a member for selectively activating and deactivating both of the first and second lighting members to provide the advanced date warnings and associated event indicators. The system can include an enlarged front surface exhibiting conventional calendar information indicia that can be used in conjunction with the first member.

U.S. Pat. No. 6,721,685

Inventor: Ryuichiro Kodama

Issued: Apr. 13, 2004

A maintenance monitor mechanism 300 comprises of a maintenance control section 310 that controls and carries out remote maintenance of an apparatus-to-be-maintained, a maintenance history storage unit 320 that records maintenance history, and a display unit 350. The maintenance control section 310 acquires the date and time of the maintenance last carried out from the maintenance history storage unit 320 and displays "Maintenance Not Problematic" if the difference between the last maintenance date and time and the present date and time does not exceed a required maintenance interval or displays "Maintenance Problematic" if the difference exceeds the interval. With said arrangement, it is possible to provide a remote maintenance system that informs the personnel in charge as to whether maintenance has been carried out surely and correctly and to definitely judge whether the apparatus is really in a usable condition.

U.S. Pat. No. 4,404,641

Inventor: Louis M. Bazarnik

Issued: Sep. 13, 1983

Disclosed is a maintenance monitor which at a preselected interval will automatically alert one that the equipment of concern is due for maintenance. The maintenance monitor includes a control unit sensing device such as a switch inductive pickup etc., a programmable module counter activated by a signal from the sensing device and a display for readout of the counter and to advise of the maintenance period or to perform a function.

U.S. Pat. No. 5,910,931

Inventor: Brad M. Pettyjohn

Issued: Jun. 8, 1999

An automobile annual inspection reminder device sets off flashingly a bright light emitting diode (LED) approximately a month before the due date of the next automobile inspection. The device employs conventional battery operated digital watch circuitry to facilitate the setting of a counter/memory to the current time and date and the storage in memory of representations of the inspection due month and day thereof as well as of an earlier alarm date differing by a predetermined interval from the inspection-due date indicated by the facility and storing the same in the memory. A micro switch is provided for each of the twelve months of the year to set the inspection due date in memory. A "Snooze" button provides for temporary inactivation of the LED or beeper. After an inspection, the device can be set to the new inspection-due date.

European Patent Number WO 02/093509

Inventor: Lim May May Yvonne

Issued: Nov. 21, 2002

A parking meter unit (10) is disclosed for mounting in a vehicle. The parking meter unit (10) includes processing means (20) and timing means (23) for supplying timing signals to the processing means. The parking meter unit (10) further includes card reading means (21) for deducting value from a stored value card under control of the processing (20) means and transceiver means (24) operably associated with the processing means (20) for exchanging data with an interrogating unit, the interrogating unit being adapted to interrogate a status of the parking meter unit remote from the parking meter unit (10). The interrogating unit may be adapted to forward a penalty message to the parking meter unit (10) in response to an invalid status of the parking meter unit (10).

U.S. Pat. No. 4,533,900

Inventor: Heinz Muhlberger et al.

Issued: Aug. 6, 1985

A service interval display unit for a motor vehicle for alerting the operator of required maintenance wherein actual distance traveled by the vehicle is monitored, and as a factor in determining the service interval, operating parameters such as engine speed, coolant temperature, oil temperature, and/or fuel consumption rate are taken into consideration on a weighted basis to assert earlier a service signal in the display unit when the engine experiences increased periods of higher loads. The display unit includes a series of indicators which are successively extinguished upon attainment of subintervals during the maintenance cycle and warning lights which are energized after attainment of the service interval. Additional warning lights also are provided for emphasizing the expiration of the service interval when the vehicle is operated successive fixed distance intervals beyond the regular service interval.

U.S. Pat. No. 6,026,060

Inventor: Alan W. Rothschild et al.

Issued: Feb. 15, 2000

A vehicle sticker for monitoring a time-period associated with a motor vehicle, comprises an electronic timer, first and second indicator devices, and some mechanism for affixing the sticker to the vehicle. The timer is configured to time the time-period associated with the vehicle and to generate an "impending expiration" signal and an "expiration" signal. The first indicator device is coupled to the timer, and is configured to indicate an "impending expiration" or a "renewal" warning in response to the impending expiration signal. The second indicator device is also coupled to the timer, and is configured to indicate the expiration of the time-period in response to the expiration signal. The affixing mechanism must hold the sticker on the vehicle, in such a position that the impending expiration indication is directed to someone inside the vehicle and the expiration indication is directed to someone outside the vehicle.

SUMMARY OF THE PRESENT INVENTION

The present invention is an alarm mechanism designed to notify a user when the motor vehicle registration is coming up for renewal and/or that the vehicle inspection is coming up for renewal. The notification can be a flashing light or an audio tone or message emitted by the alarm mechanism or any combination thereof, which may additionally include a subscription phone notification service from a service bureau. The alarm mechanism is comprised of a housing that may vary in shape having a front surface and a back surface. The back surface may include a fastening element whereby the device can be fixedly or removable attached to a structure, such as an adhesive element for attachment to a motor vehicle or a magnetic element for attachment to a magnetic material.

The front surface contains a display area with means for setting various timers and clock display. In the preferred embodiment, the current date and time is set using the provided buttons. There are also buttons for setting the expiration date for the vehicle registration that is displayed in the registration display window and buttons for setting the vehicle inspection expiration date that is displayed in the inspection display window. Once the expiration of either approached a predetermined time period relative to the current date, such as a week or ten days, the alarm mechanism will engage the notification system.

A primary object of the present invention is to provide an alarm mechanism for vehicle inspection and registration that overcomes the shortcomings of the prior art.

Another, secondary object of the present invention is to provide an alarm mechanism that selectively notifies a user of an upcoming yearly vehicle inspection.

Yet another, secondary object of the present invention is to provide an alarm mechanism that selectively notifies a user of an upcoming vehicle registration renewal.

Still yet another object of the present invention is to provide an alarm mechanism that may be formed as a stand-alone unit or formed integral within a vehicle.

A further object of the present invention is to provide an alarm mechanism including a display for selectively displaying a date representing the next required vehicle inspection.

Yet a further object of the present invention is to provide an alarm mechanism including a display for selectively displaying a date representing the next required vehicle registration renewal.

Still a further object of the present invention is to provide an alarm mechanism that selectively displays the month and year of the next required vehicle registration renewal and vehicle inspection.

Another object of the present invention is to provide an alarm mechanism that includes at least one alarm mechanism for selectively alerting a user to the upcoming registration renewal and/or vehicle inspection.

Yet another object of the present invention is to provide an alarm mechanism wherein the at least one alarm mechanism is an audible alert mechanism and a visual alert mechanism.

An even further object of the present invention is to provide an alarm mechanism including means for programming the current date and time, the registration expiration date and vehicle inspection expiration date.

Still a further object of the present invention is to provide an inspection alarm wherein the audible alert is either a recorded message or an audible tone.

A further object of the present invention is to provide an inspection alarm wherein the visual alert is a flashing light.

Still a further object of the present invention is to provide an alarm mechanism including means for communicating with an external device for at least one of receiving the date representing the next inspection and providing an additional notification to the user that the date is upcoming.

Another object of the present invention is to provide an alarm mechanism wherein the user can selectively determine a time period wherein the alarm will alert the user.

Yet another object of the present invention ius to provide a subscriber phone service for notifying the user of an upcoming registration renewal and/or inspection renewal.

Yet another object of the present invention is to provide an alarm mechanism that is simple and easy to use.

Still yet another object of the present invention is to provide an alarm mechanism that is inexpensive to manufacture and operate.

Additional objects of the present invention will appear as the description proceeds.

The present invention overcomes the shortcomings of the prior art by providing an alarm mechanism for selectively notifying a user as to an upcoming date of a required registration renewal and/or vehicle inspection. The alarm includes a display for selectively displaying a date representing the upcoming registration renewal and upcoming inspection renewal and an alarm mechanism for selectively notifying a user that either or both dates are within a predetermined number of days prior to expiration. The alarm mechanism is at least one of a visual alarm and an audible alarm.

The foregoing and other objects and advantages will appear from the description to follow. In the description reference is made to the accompanying drawing, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawing, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

In order that the invention may be more fully understood, it will now be described, by way of example, with reference to the accompanying drawing in which.

DESCRIPTION OF THE REFERENCED NUMERALS

Figure 1:
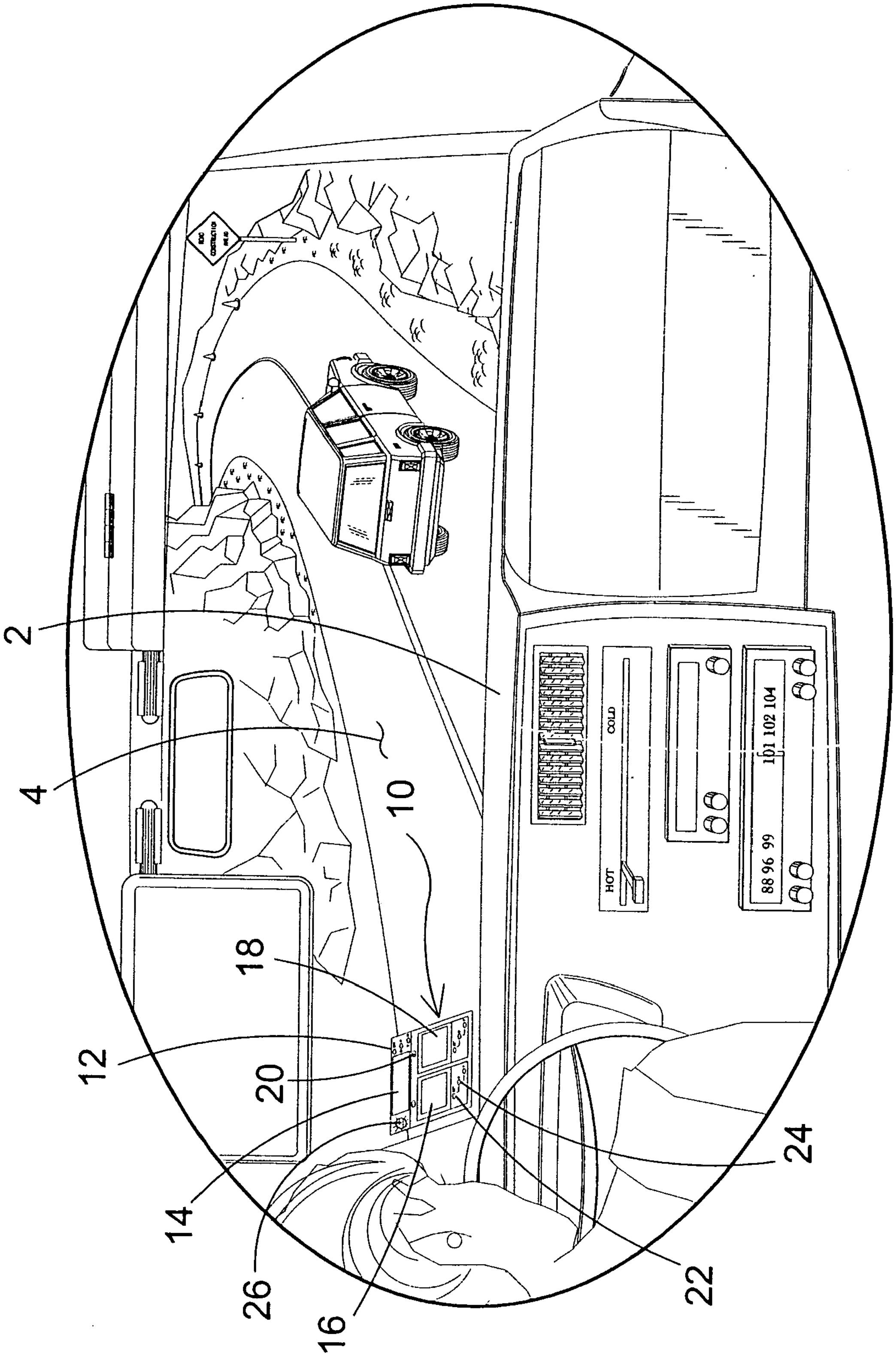
FIG. 1 is an illustrative view of the alarm mechanism of the present invention positioned on a windshield of a vehicle.

Turning now descriptively to the drawings, in which similar reference characters denote similar elements throughout the several views, the Figures illustrate the inspection alarm of the present invention. With regard to the reference numerals used, the following numbering is used throughout the various drawing Figures.

2 vehicle
4 windsheild
6 dashboard
10 alarm mechanism of the present invention
12 housing
14 clock display
16 registration display
18 inspection display
20 visual alert mechanism
22 alert selection button
24 timing selection button
26 audible alert mechanism
28 sound
32 light
34 chain
35 key chain
36 key ring
38 refrigerator
39 magnet
40 processor
42 timing mechanism
44 sound alert
46 verbal alert
48 transceiver
50 external device
52 signal
54 personal computer
56 personal digital assistant
58 auto shop computer
60 telephone notification system

DETAILED DESCRIPTION OF THE PREFERRED EMBODIMENT

The following discussion describes in detail one embodiment of the invention. This discussion should not be construed, however, as limiting the invention to those particular embodiments, practitioners skilled in the art will recognize numerous other embodiments as well. For definition of the complete scope of the invention, the reader is directed to appended claims.

Turning now descriptively to the drawings, in which similar reference characters denote similar elements throughout the several views, FIGS. 1 through 12 illustrate alarm mechanism of the present invention indicated generally by the numeral 10.

FIG. 1 is an illustrative view of the alarm mechanism 10 of the present invention positioned on a windshield 4 of a vehicle 2. The alarm mechanism 10 of the present invention allows a user to selectively program a date on which an event is to occur. Preferably, the date programmed into the alarm mechanism 10 is an inspection date which is the date by which the vehicle 2 must be inspected. Additionally, the date selectively programmed in to the alarm mechanism is the registration date which is the date on which the vehicle was registered. The alarm mechanism 10 alerts the user when the dates programmed therein are forthcoming thereby signifying that the user take a required action including at least one of having the vehicle inspected and registering the vehicle.

The inspection alarm 10 of the present invention includes a housing 12 having a front side and a rear side. The housing is connected to the windshield 4 of the vehicle 2 by a fastening means, not shown positioned on the rear side of the housing 12. The housing is releaseably connected to the windshield 4 by positioning the rear side thereof adjacently against the windshield 4.

A clock display 14 is positioned on the front side of the housing and displays the time of day to the user. Also positioned on the front side of the housing 14 is a registration display 16 and an inspection display 18. The registration display 16 is selectively programmable for displaying at least one of the date that the vehicle was registered and the date on which the registration must be renewed. The dates can be displayed at least one of simultaneously, individually and in an alternating pattern. The inspection display 18 is also selectively programmable to display at least one of the date that the vehicle was previously inspected and the date on which the car must be re-inspected. The user is notified of the important dates using an alarm mechanism. The user is able to selectively input the predetermined date by using the timing mechanism 24. This allows the user to selectively program the date and time on which the user should alerted for each of the registration display 16 and the inspection delay 18 which is set into memory by depressing a set button 22. The alarm mechanism is at least one of a visual alert mechanism 20 and an audible alert mechanism 26. Upon a predetermined date being realized by the mechanism 10 of the present invention, the at least one of the visual alert 20 and the audible alert 26 notify the user that an action should be taken. Preferably, the visual alert 20 is a light that is illuminated and the audible alert 26 emits a sound from a speaker therefrom. The sound is at least one of a predetermined sound and a musical sound received by the vehicles radio transceiver. The user is able to selectively determine the manner in which he/she is alerted to the pre-stored date by using an alert selection button 25. The alert selection button allows the user to cycle between different pre-stored alert settings including at least one of visual and audio alerts, visual alerts, audio alerts and alternating visual and audio alerts.

Figure 2:
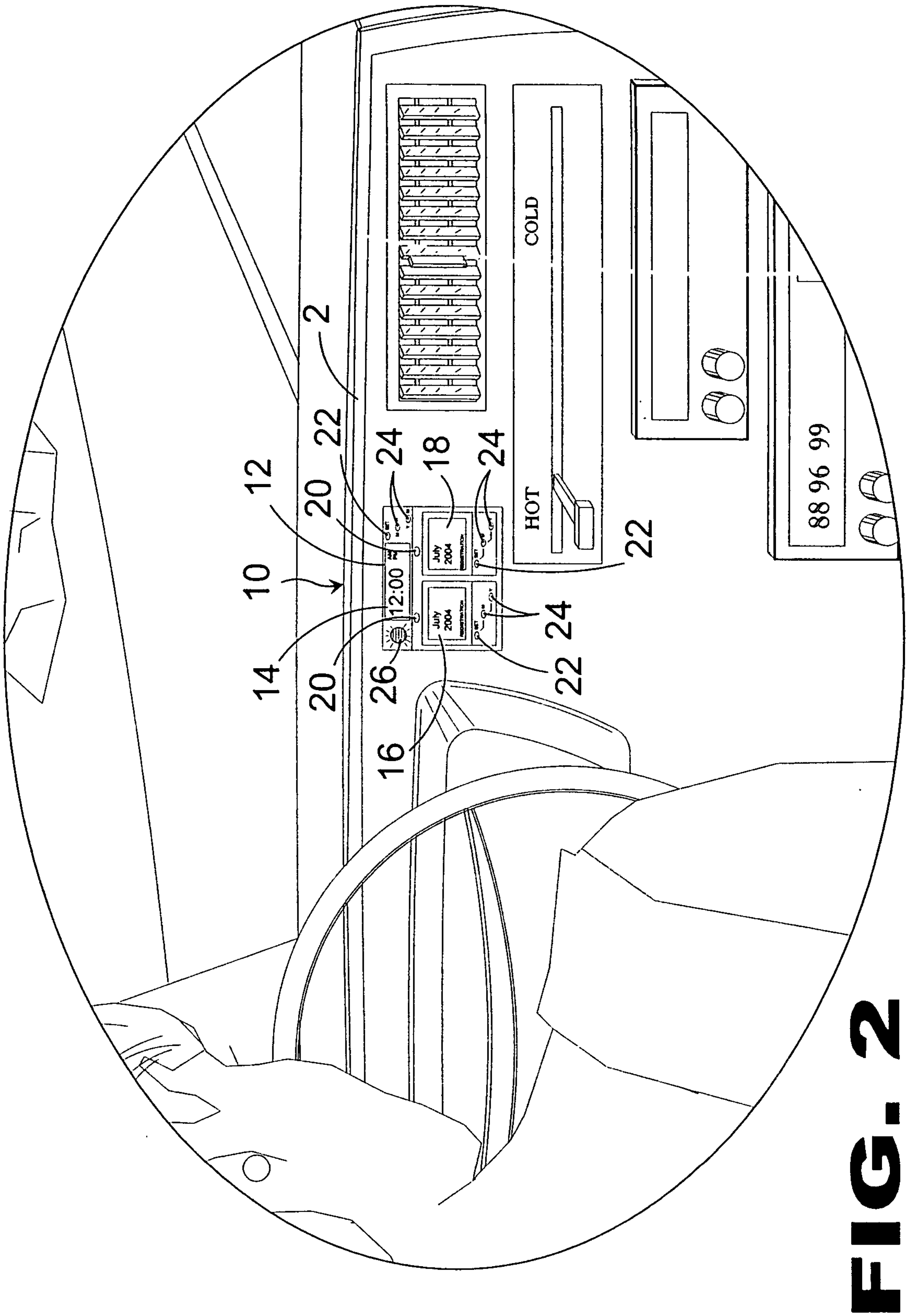
FIG. 2 is an illustrative view of the alarm mechanism of the present invention formed integral with the vehicle dashboard.

FIG. 2 is an illustrative view of the alarm mechanism of the present invention formed integral with the vehicle dashboard 6. The alarm mechanism 10 of the present invention allows a user to selectively program a date on which an event is to occur. Preferably, the date programmed into the alarm mechanism 10 is an inspection date which is the date by which the vehicle 2 must be inspected. Additionally, the date selectively programmed in to the alarm mechanism is the registration date which is the date on which the vehicle was registered. The alarm mechanism 10 alerts the user when the dates programmed therein are forthcoming thereby signifying that the user take a required action including at least one of having the vehicle inspected and registering the vehicle.

The inspection alarm 10 of the present invention includes a housing 12 having a front side and a rear side. The housing 12 is formed integral with the dashboard 6 of the vehicle 2.

A clock display 14 is positioned on the front side of the housing and displays the time of day to the user. Also positioned on the front side of the housing 14 is a registration display 16 and an inspection display 18. The registration display 16 is selectively programmable for displaying at least one of the date that the vehicle was registered and the date on which the registration must be renewed. The dates can be displayed at least one of simultaneously, individually and in an alternating pattern. The inspection display 18 is also selectively programmable to display at least one of the date that the vehicle was previously inspected and the date on which the car must be re-inspected. The user is notified of the important dates using an alarm mechanism. The user is able to selectively input the predetermined date by using the timing mechanism 24. This allows the user to selectively program the date and time on which the user should alerted for each of the registration display 16 and the inspection delay 18. The alarm mechanism is at least one of a visual alert mechanism 20 and an audible alert mechanism 26. Upon a predetermined date being realized by the mechanism 10 of the present invention, the at least one of the visual alert 20 and the audible alert 26 notify the user that an action should be taken. Preferably, the visual alert 20 is a light that is illuminated and the audible alert 26 emits a sound from a speaker therefrom. The sound is at least one of a predetermined sound and a musical sound received by the vehicles radio transceiver. The user is able to selectively determine the manner in which he/she is alerted to the pre-stored date by using an alert selection button 25. The alert selection button allows the user to cycle between different pre-stored alert settings including at least one of visual and audio alerts, visual alerts, audio alerts and alternating visual and audio alerts.

Figure 3:
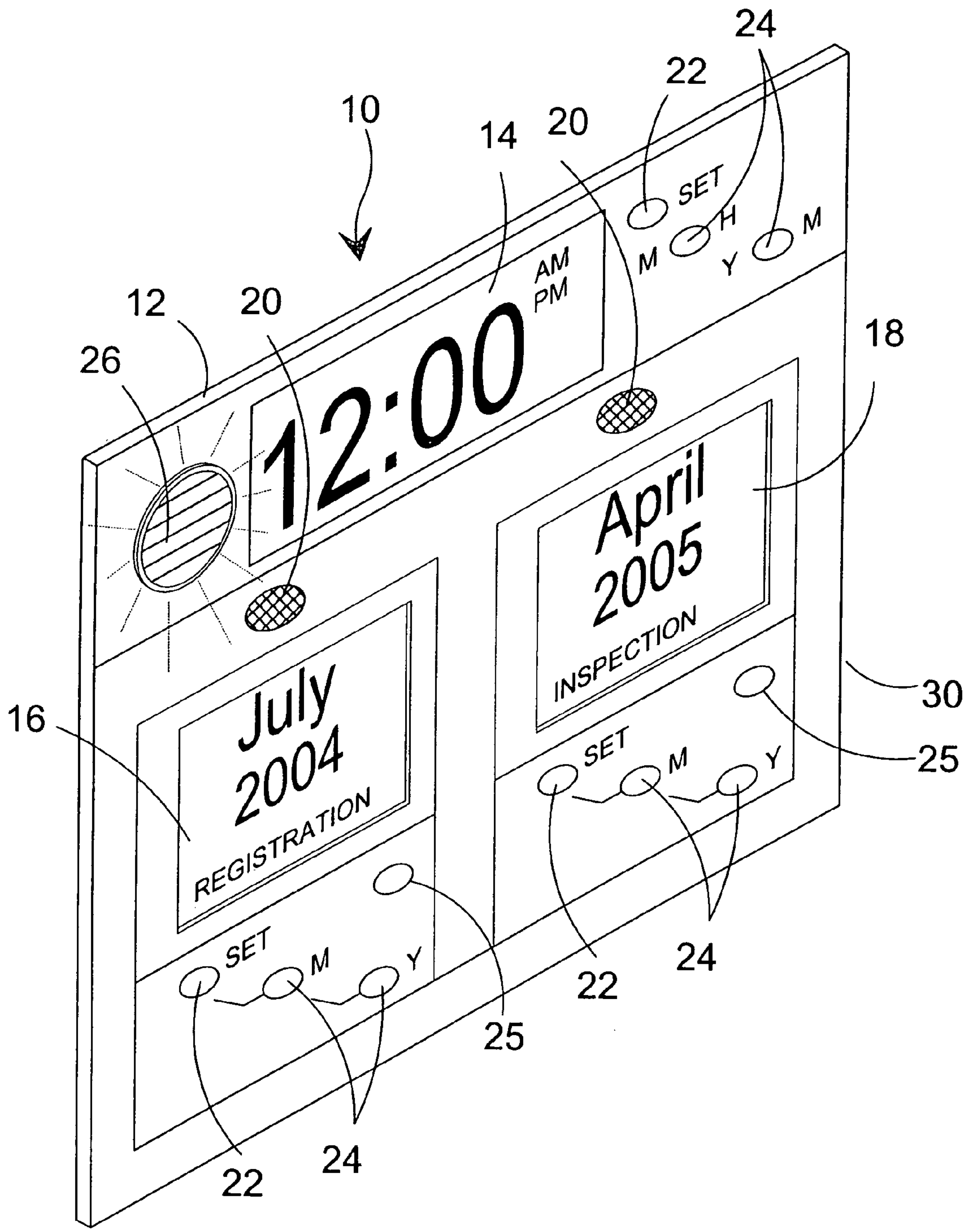
FIG. 3 is perspective view of the alarm mechanism of the present invention with the audible alert being activated.

FIG. 3 is perspective view of the alarm mechanism of the present invention with the audible alert being activated. The inspection alarm 10 of the present invention includes a housing 12 having a front side and a rear side. The housing 12 is at least one of releasebly connected to the windshield 4 of the vehicle 2 and is formed integral with the dashboard 6 of the vehicle 2.

The clock display 14 is positioned on the front side of the housing and displays the time of day to the user. Also positioned on the front side of the housing 14 is the registration display 16 and an inspection display 18. The registration display 16 is selectively programmable for displaying at least one of the date that the vehicle was registered and the date on which the registration must be renewed. The dates can be displayed at least one of simultaneously, individually and in an alternating pattern. The inspection display 18 is also selectively programmable to display at least one of the date that the vehicle was previously inspected and the date on which the car must be re-inspected. The user is notified of the important dates using an alarm mechanism. The user is able to selectively input the predetermined date by using the timing mechanism 24. This allows the user to selectively program the date and time on which the user should alerted for each of the registration display 16 and the inspection delay 18. The alarm mechanism is at least one of a visual alert mechanism 20 and an audible alert mechanism 26. Upon a predetermined date being realized by the mechanism 10 of the present invention, the at least one of the visual alert 20 and the audible alert 26 notify the user that an action should be taken. Preferably, the visual alert 20 is a light that is illuminated and the audible alert 26 emits a sound from a speaker therefrom. The sound is at least one of a predetermined sound and a musical sound received by the vehicles radio transceiver. The user is able to selectively determine the manner in which he/she is alerted to the pre-stored date by using an alert selection button 25. The alert selection button allows the user to cycle between different pre-stored alert settings including at least one of visual and audio alerts, visual alerts, audio alerts and alternating visual and audio alerts.

When the inspection date and the registration date need to be updated, the user inputs the new dates with the timing mechanism 24. The timing mechanism 24 includes a month button and a year button which are selectively depressed so as to display the desired month and year of the upcoming event. As the month and year buttons are depressed, the respective displays 16,18 change so that the user is able to visually see the month and year that will be stored therein. When the desired month is displayed on the screens 16,18, the user depresses the set button 22 which causes the displayed date to be retained in a memory.

As shown in FIG. 3, the registration display is displaying that the registration must be renewed in July 2004. The user is then alerted by the audible alert mechanism 26 which emits a sound through a speaker contained in the housing 12. Preferably, the audible alert is a tone. However, the audible alert can be any sound emitted from a speaker. Furthermore, the alarm mechanism 10 of the present invention can be selectively programmed to emit the audible alert at predetermined intervals including once a day, once a week, and once a month. These intervals are described for purposes of example only and can be any combination of intervals. The audible alert will be emitted at any of the above intervals until the user selective re-programs a new date using the timing mechanism 24 and the set button 22. The time and pattern of the audible alert can also be selectively programmed using the alarm switch 25. For example, the alert can be set to emitted when the vehicle engine is started or when the doors are locked. However, any event could be used to cause the audible alert to be emitted. Also the alert can be emitted for a predetermined length of time and then automatically turned off. Alternatively, there could be a disable switch for manually disabling the alarm mechanism 10 of the present invention.

Figure 4:
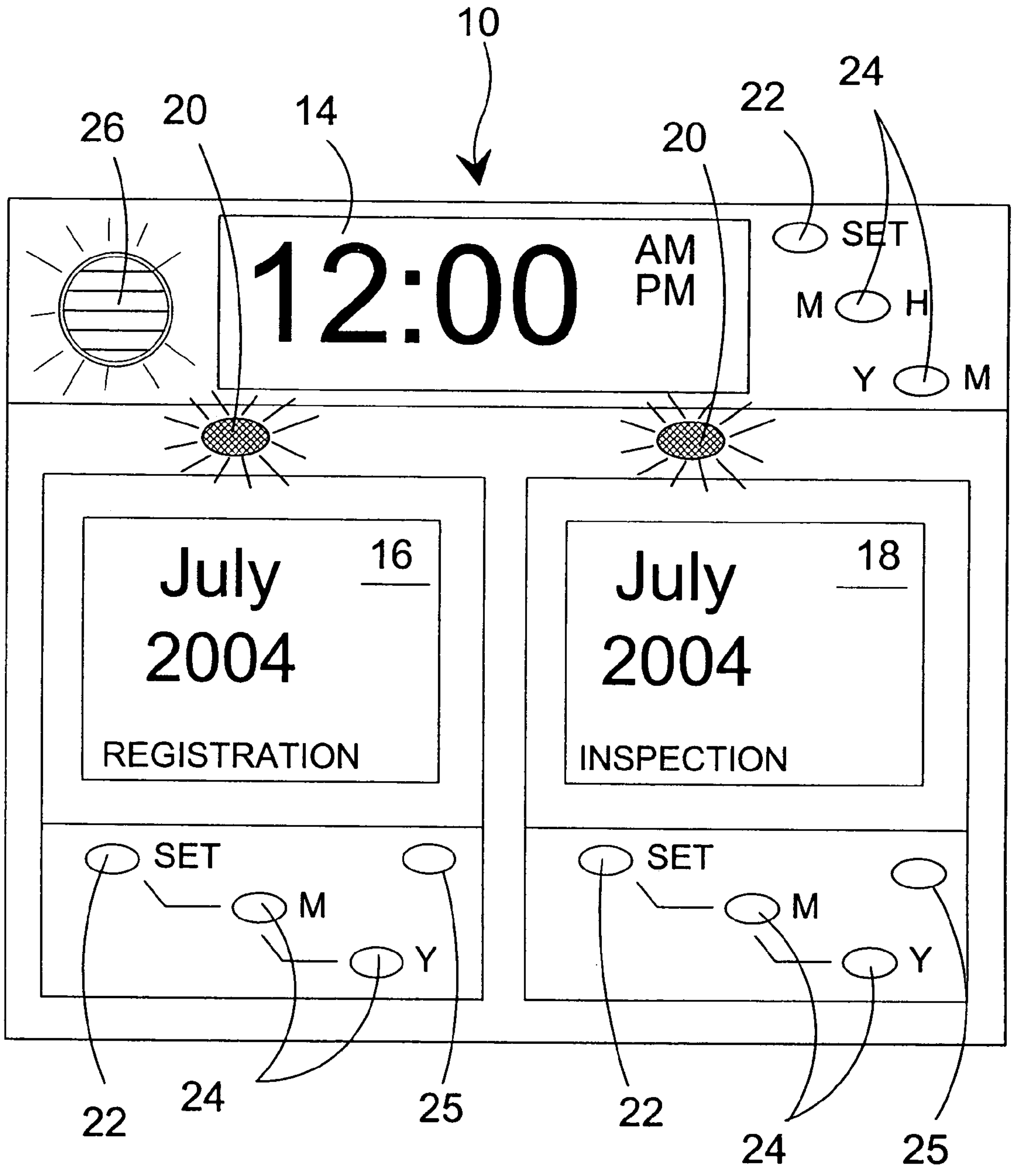
FIG. 4 is perspective view of the alarm mechanism of the present invention with the visual alert being activated.

FIG. 4 is perspective view of the alarm mechanism of the present invention with the visual alert being activated. The inspection alarm 10 of the present invention includes a housing 12 having a front side and a rear side. The housing 12 is at least one of releasebly connected to the windshield 4 of the vehicle 2 and is formed integral with the dashboard 6 of the vehicle 2.

The clock display 14 is positioned on the front side of the housing and displays the time of day to the user. Also positioned on the front side of the housing 14 is the registration display 16 and an inspection display 18. The registration display 16 is selectively programmable for displaying at least one of the date that the vehicle was registered and the date on which the registration must be renewed. The dates can be displayed at least one of simultaneously, individually and in an alternating pattern. The inspection display 18 is also selectively programmable to display at least one of the date that the vehicle was previously inspected and the date on which the car must be re-inspected. The user is notified of the important dates using an alarm mechanism. The user is able to selectively input the predetermined date by using the timing mechanism 24. This allows the user to selectively program the date and time on which the user should alerted for each of the registration display 16 and the inspection delay 18. The alarm mechanism is at least one of a visual alert mechanism 20 and an audible alert mechanism 26. Upon a predetermined date being realized by the mechanism 10 of the present invention, the at least one of the visual alert 20 and the audible alert 26 notify the user that an action should be taken. Preferably, the visual alert 20 is a light that is illuminated and the audible alert 26 emits a sound from a speaker therefrom. The sound is at least one of a predetermined sound and a musical sound received by the vehicles radio transceiver. The user is able to selectively determine the manner in which he/she is alerted to the pre-stored date by using an alert selection button 25. The alert selection button allows the user to cycle between different pre-stored alert settings including at least one of visual and audio alerts, visual alerts, audio alerts and alternating visual and audio alerts.

When the inspection date and the registration date need to be updated, the user inputs the new dates with the timing mechanism 24. The timing mechanism 24 includes a month button and a year button which are selectively depressed so as to display the desired month and year of the upcoming event. As the month and year buttons are depressed, the respective displays 16,18 change so that the user is able to visually see the month and year that will be stored therein. When the desired month is displayed on the screens 16,18, the user depresses the set button 22 which causes the displayed date to be retained in a memory.

As shown in FIG. 4, the registration display 16 is displaying that the registration must be renewed in July 2004. Also shown, is the inspection display 18 displaying that the vehicle must be re-inspected in July 2004. The user is then alerted by the audible alert mechanism 26 which emits a sound through a speaker contained in the housing 12 as well as a visual alert 20 positioned above each respective display screens 16,18. Preferably, the audible alert is a tone. However, the audible alert can be any sound emitted from a speaker. The visual alert is preferably a flashing light. Furthermore, the alarm mechanism 10 of the present invention can be selectively programmed to emit the audible alert and visual alert at predetermined intervals including once a day, once a week, and once a month. These intervals are described for purposes of example only and can be any combination of intervals. The audible alert and visual alerts will be emitted at any of the above intervals until the user selective re-programs a new date using the timing mechanism 24 and the set button 22. The time and pattern of the alerta can also be selectively programmed using the alarm switch 25. For example, the alert can be set to emitted when the vehicle engine is started or when the doors are locked. However, any event could be used to cause the audible alert to be emitted. Also the alert can be emitted for a predetermined length of time and then automatically turned off. Alternatively, there could be a disable switch for manually disabling the alarm mechanism 10 of the present invention.

Figure 5:
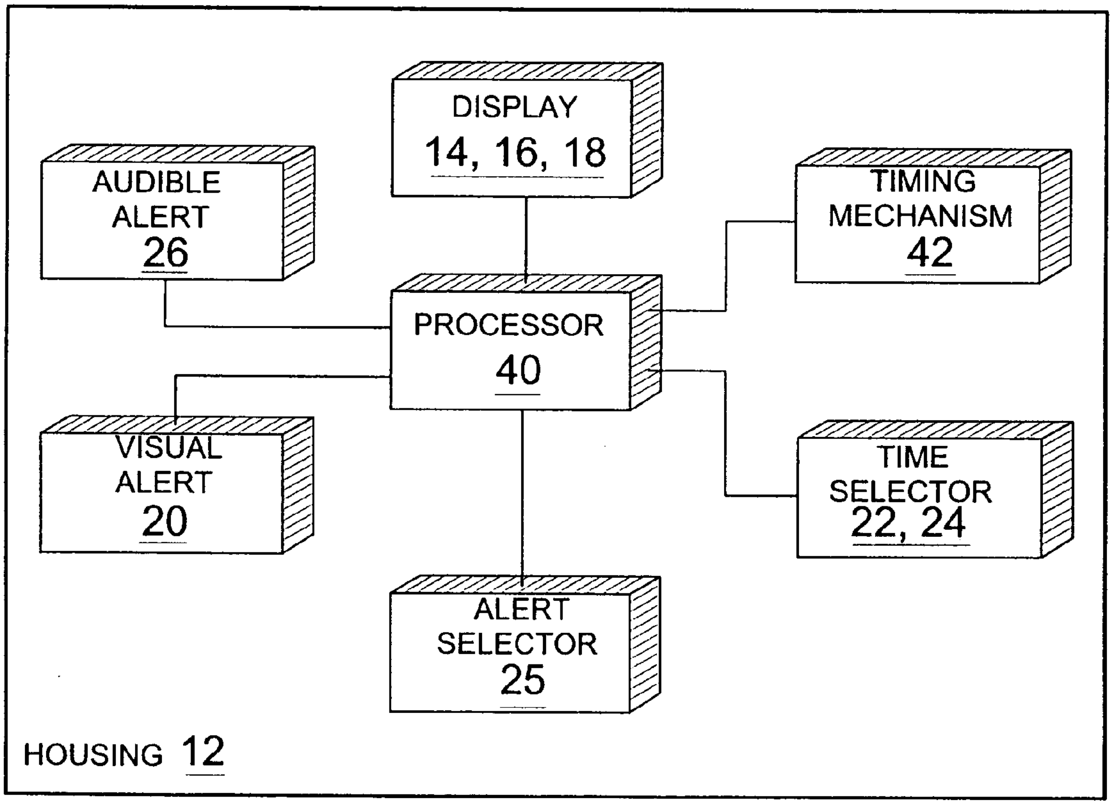
FIG. 5 is a block diagram of the of the alarm mechanism of the present invention.

FIG. 5 is a block diagram of the of the alarm mechanism of the present Invention. The alarm 10 of the present invention includes a processor 40 positioned within the housing 12. The displays 14,16,18 are connected to the processor 40 which selectively controls what data is displayed on each respective display screen 14, 16, 18. The display screens are the clock display 14, the registration display 16 and the inspection display 18. A timing mechanism 42 is connected to the processor 40 for keeping time. Also connected to the processor 40 is the time selector 24, the alert selector 25, the audible alert 26 and the visual alert 20. The time selector 24 includes a month button and a year button for selectively changing the month and year displayed on the screens 16 and 18.

The timing mechanism 42 provides the accurate date, month and year to the processor 40. When the users selectively programs at least one of the registration display 16 and the inspection display 18 to display a desired month and year, the timing mechanism 42 keeps track thereof. The user then selects the manner in which he/she I to be alerted when the programmed time/date equals the actual time/date using the alert selector 25. When the programmed time equals the actual time according to the mechanism 42, the processor 40 signals at least one of the audible alert 26 and the visual alert 20 to emit their respective alerts and notify the user that a programmed date/time is equal to the actual time/date thereby reminding the user to perform the desired event such as have the vehicle inspected or renewing the registration thereof.

Figure 6:
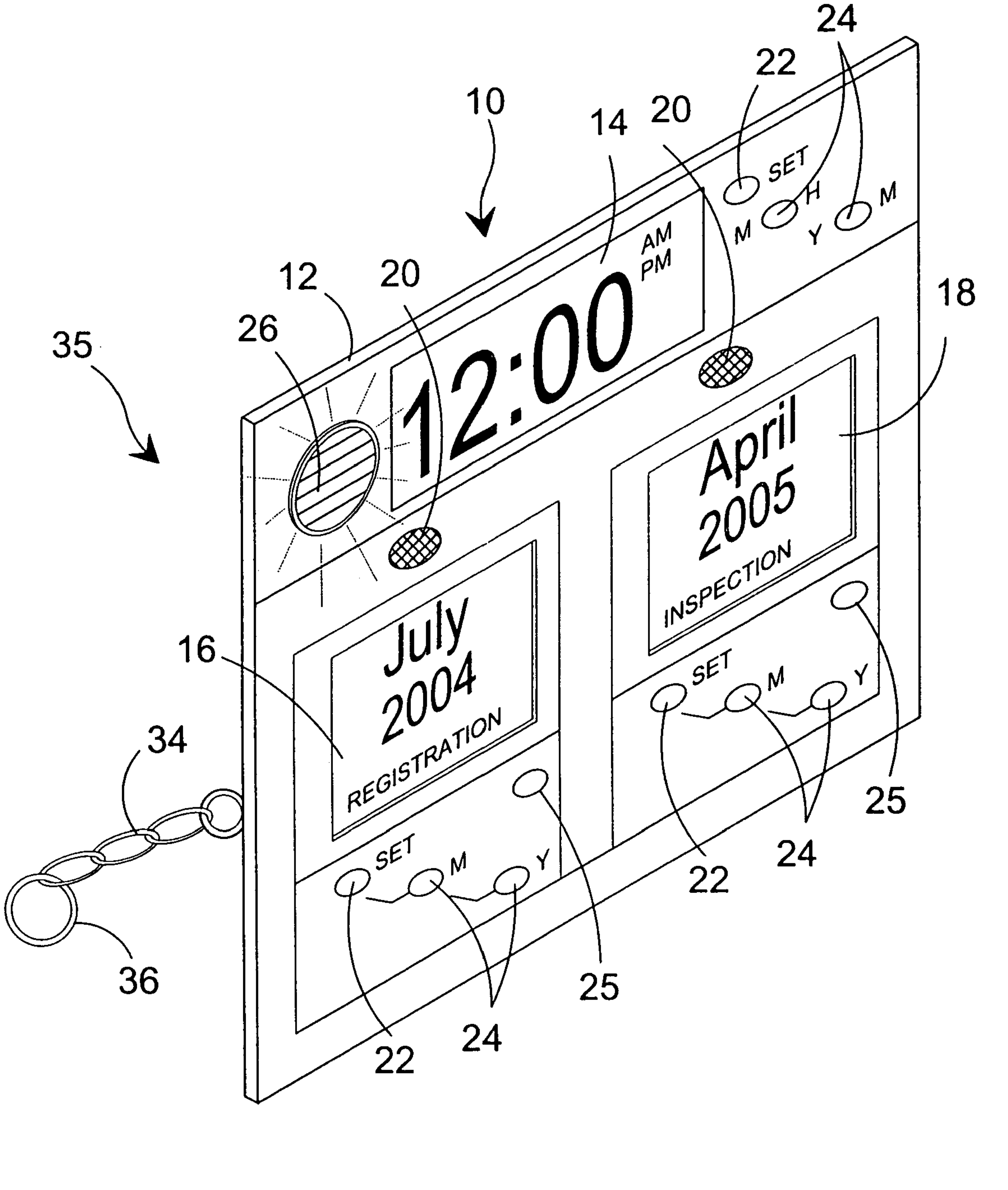
FIG. 6 is a perspective view of the alarm mechanism of the present invention being formed as a keychain.

FIG. 6 is a perspective view of the alarm mechanism of the present invention being formed as a keychain. The inspection alarm 10 of the present invention includes a housing 12 having a front side and a rear side. A key chain 34 having a key ring 36 is connected to the housing 12 and allows the alarm mechanism to be easily transported with the user.

The clock display 14 is positioned on the front side of the housing and displays the time of day to the user. Also positioned on the front side of the housing 14 is the registration display 16 and an inspection display 18. The registration display 16 is selectively programmable for displaying at least one of the date that the vehicle was registered and the date on which the registration must be renewed. The dates can be displayed at least one of simultaneously, individually and in an alternating pattern. The inspection display 18 is also selectively programmable to display at least one of the date that the vehicle was previously inspected and the date on which the car must be re-inspected. The user is notified of the important dates using an alarm mechanism. The user is able to selectively input the predetermined date by using the timing mechanism 24. This allows the user to selectively program the date and time on which the user should alerted for each of the registration display 16 and the inspection delay 18. The alarm mechanism is at least one of a visual alert mechanism 20 and an audible alert mechanism 26. Upon a predetermined date being realized by the mechanism 10 of the present invention, the at least one of the visual alert 20 and the audible alert 26 notify the user that an action should be taken. Preferably, the visual alert 20 is a light that is illuminated and the audible alert 26 emits a sound from a speaker therefrom. The sound is at least one of a predetermined sound and a musical sound received by the vehicles radio transceiver. The user is able to selectively determine the manner in which he/she is alerted to the pre-stored date by using an alert selection button 25. The alert selection button allows the user to cycle between different pre-stored alert settings including at least one of visual and audio alerts, visual alerts, audio alerts and alternating visual and audio alerts.

When the inspection date and the registration date need to be updated, the user inputs the new dates with the timing mechanism 24. The timing mechanism 24 includes a month button and a year button which are selectively depressed so as to display the desired month and year of the upcoming event. As the month and year buttons are depressed, the respective displays 16,18 change so that the user is able to visually see the month and year that will be stored therein. When the desired month is displayed on the screens 16,18, the user depresses the set button 22 which causes the displayed date to be retained in a memory.

As shown in FIG. 3, the registration display is displaying that the registration must be renewed in July 2004. The user is then alerted by the audible alert mechanism 26 which emits a sound through a speaker contained in the housing 12.

Preferably, the audible alert is a tone. However, the audible alert can be any sound emitted from a speaker. Furthermore, the alarm mechanism 10 of the present invention can be selectively programmed to emit the audible alert at predetermined intervals including once a day, once a week, and once a month. These intervals are described for purposes of example only and can be any combination of intervals. The audible alert will be emitted at any of the above intervals until the user selective re-programs a new date using the timing mechanism 24 and the set button 22. The time and pattern of the audible alert can also be selectively programmed using the alarm switch 25. For example, the alert can be set to emitted when the vehicle engine is started or when the doors are locked. However, any event could be used to cause the audible alert to be emitted. Also the alert can be emitted for a predetermined length of time and then automatically turned off. Alternatively, there could be a disable switch for manually disabling the alarm mechanism 10 of the present invention.

Figure 7:
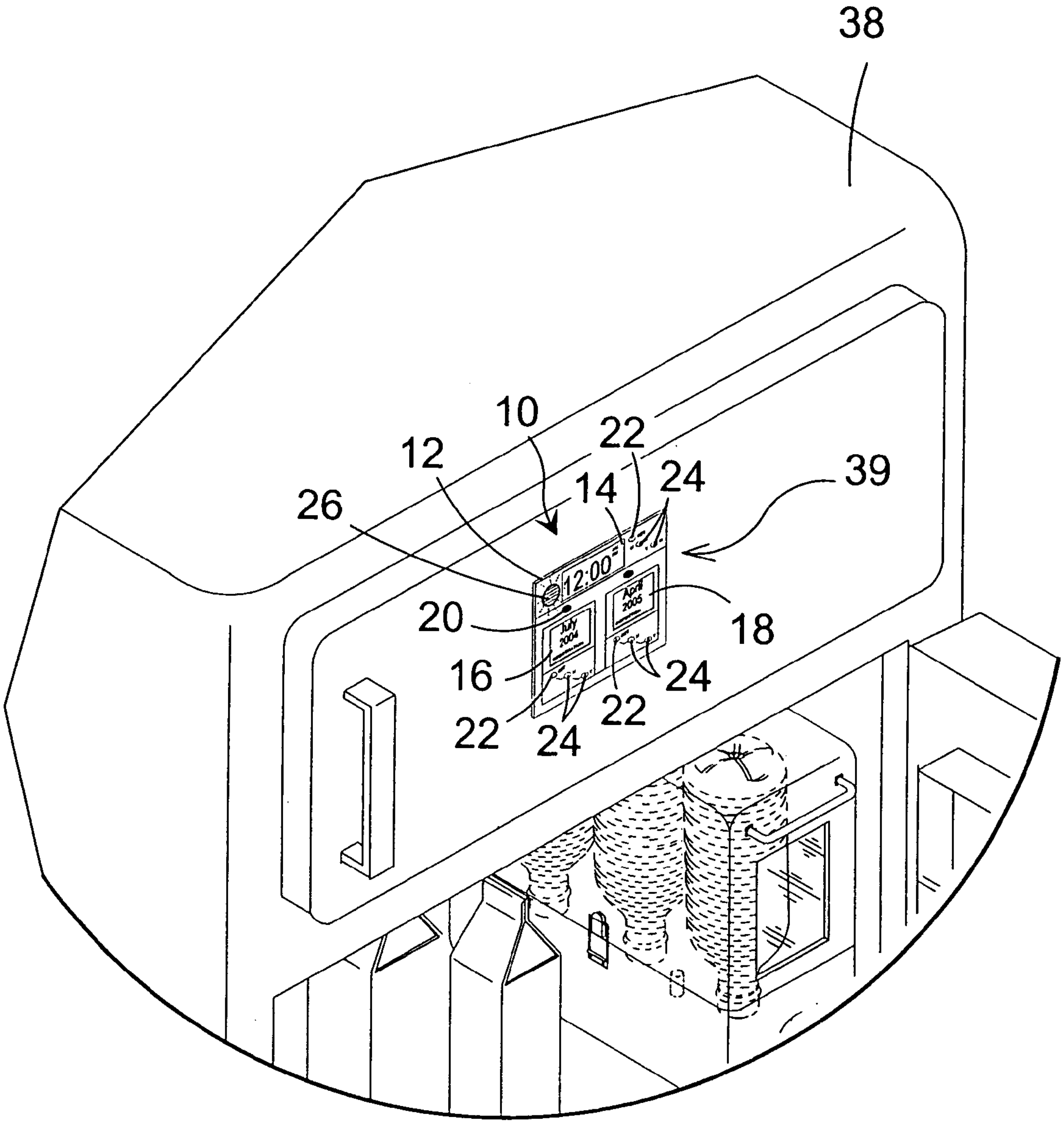
FIG. 7 is a perspective view of the of the alarm mechanism of the present invention being formed as a magnet.

FIG. 7 is a perspective view of the of the alarm mechanism of the present invention being formed as a magnet. The inspection alarm 10 of the present invention includes a housing 12 having a front side and a rear side. Positioned on the rear side of the housing 12 is a magnet for releaseably securing the alarm mechanism 10 of the present invention to a metal object. As shown herein, the alarm 10 is shown positioned on a refrigerator in a user's home.

The clock display 14 is positioned on the front side of the housing and displays the time of day to the user. Also positioned on the front side of the housing 14 is the registration display 16 and an inspection display 18. The registration display 16 is selectively programmable for displaying at least one of the date that the vehicle was registered and the date on which the registration must be renewed. The dates can be displayed at least one of simultaneously, individually and in an alternating pattern. The inspection display 18 is also selectively programmable to display at least one of the date that the vehicle was previously inspected and the date on which the car must be re-inspected. The user is notified of the important dates using an alarm mechanism. The user is able to selectively input the predetermined date by using the timing mechanism 24. This allows the user to selectively program the date and time on which the user should alerted for each of the registration display 16 and the inspection delay 18. The alarm mechanism is at least one of a visual alert mechanism 20 and an audible alert mechanism 26. Upon a predetermined date being realized by the mechanism 10 of the present invention, the at least one of the visual alert 20 and the audible alert 26 notify the user that an action should be taken. Preferably, the visual alert 20 is a light that is illuminated and the audible alert 26 emits a sound from a speaker therefrom. The sound is at least one of a predetermined sound and a musical sound received by the vehicles radio transceiver. The user is able to selectively determine the manner in which he/she is alerted to the pre-stored date by using an alert selection button 25. The alert selection button allows the user to cycle between different pre-stored alert settings including at least one of visual and audio alerts, visual alerts, audio alerts and alternating visual and audio alerts.

When the inspection date and the registration date need to be updated, the user inputs the new dates with the timing mechanism 24. The timing mechanism 24 includes a month button and a year button which are selectively depressed so as to display the desired month and year of the upcoming event. As the month and year buttons are depressed, the respective displays 16,18 change so that the user is able to visually see the month and year that will be stored therein. When the desired month is displayed on the screens 16,18, the user depresses the set button 22 which causes the displayed date to be retained in a memory.

As shown in FIG. 7, the registration display is displaying that the registration must be renewed in July 2004. The user is then alerted by the audible alert mechanism 26 which emits a sound through a speaker contained in the housing 12. Preferably, the audible alert is a tone. However, the audible alert can be any sound emitted from a speaker. Furthermore, the alarm mechanism 10 of the present invention can be selectively programmed to emit the audible alert at predetermined intervals including once a day, once a week, and once a month. These intervals are described for purposes of example only and can be any combination of intervals. The audible alert will be emitted at any of the above intervals until the user selective re-programs a new date using the timing mechanism 24 and the set button 22. The time and pattern of the audible alert can also be selectively programmed using the alarm switch 25. For example, the alert can be set to emitted when the vehicle engine is started or when the doors are locked. However, any event could be used to cause the audible alert to be emitted. Also the alert can be emitted for a predetermined length of time and then automatically turned off. Alternatively, there could be a disable switch for manually disabling the alarm mechanism 10 of the present invention.

Figure 8:
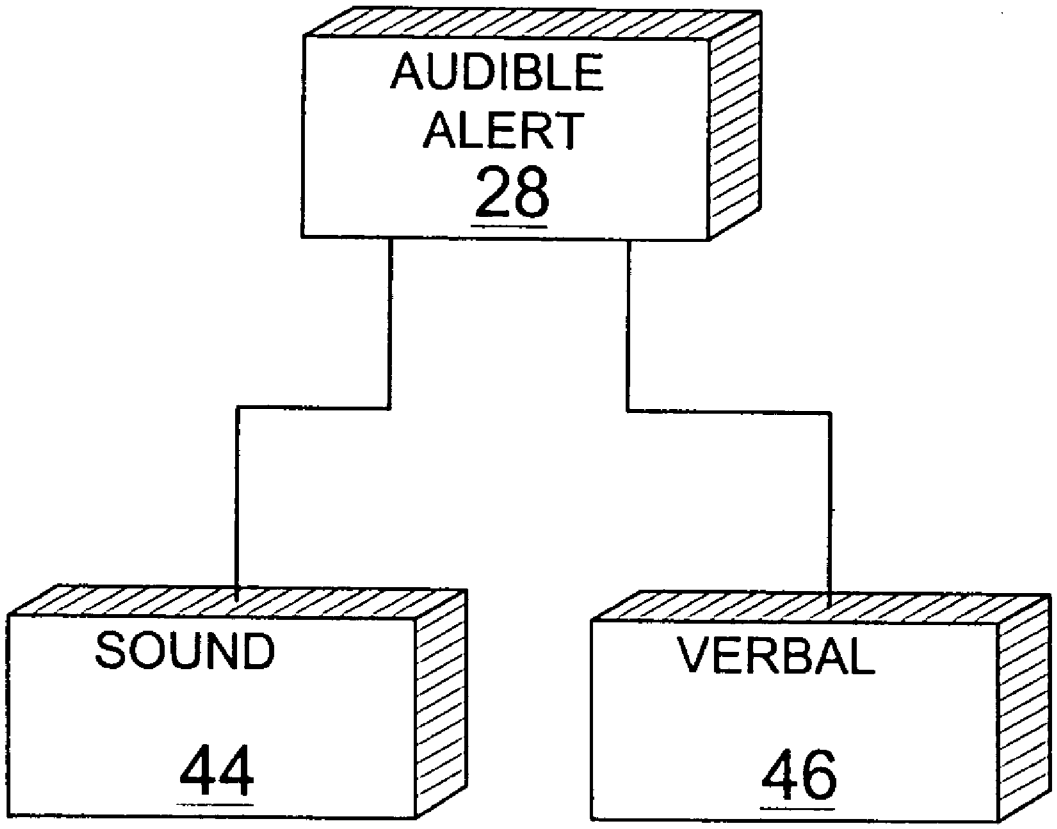
FIG. 8 is block diagram of the audible alert mechanism of the alarm mechanism of the present invention.

FIG. 8 is block diagram of the audible alert mechanism of the alarm mechanism of the present invention. The audible alert 28 includes a sound alert 44 and a verbal alert 46. The sound alert 44 is any tone that is either pre-programmed or selectively programmable by a user. The sound can be at least one a tone and musical composition. The verbal alert 46 is also at least one of a pre-programmed verbal statement and a statement selectively programmed by the user. The alert selector 25 allows the user to selectively toggle between the type of audible alert 28 emitted by the alarm mechanism 10 of the present invention.

Figure 9:
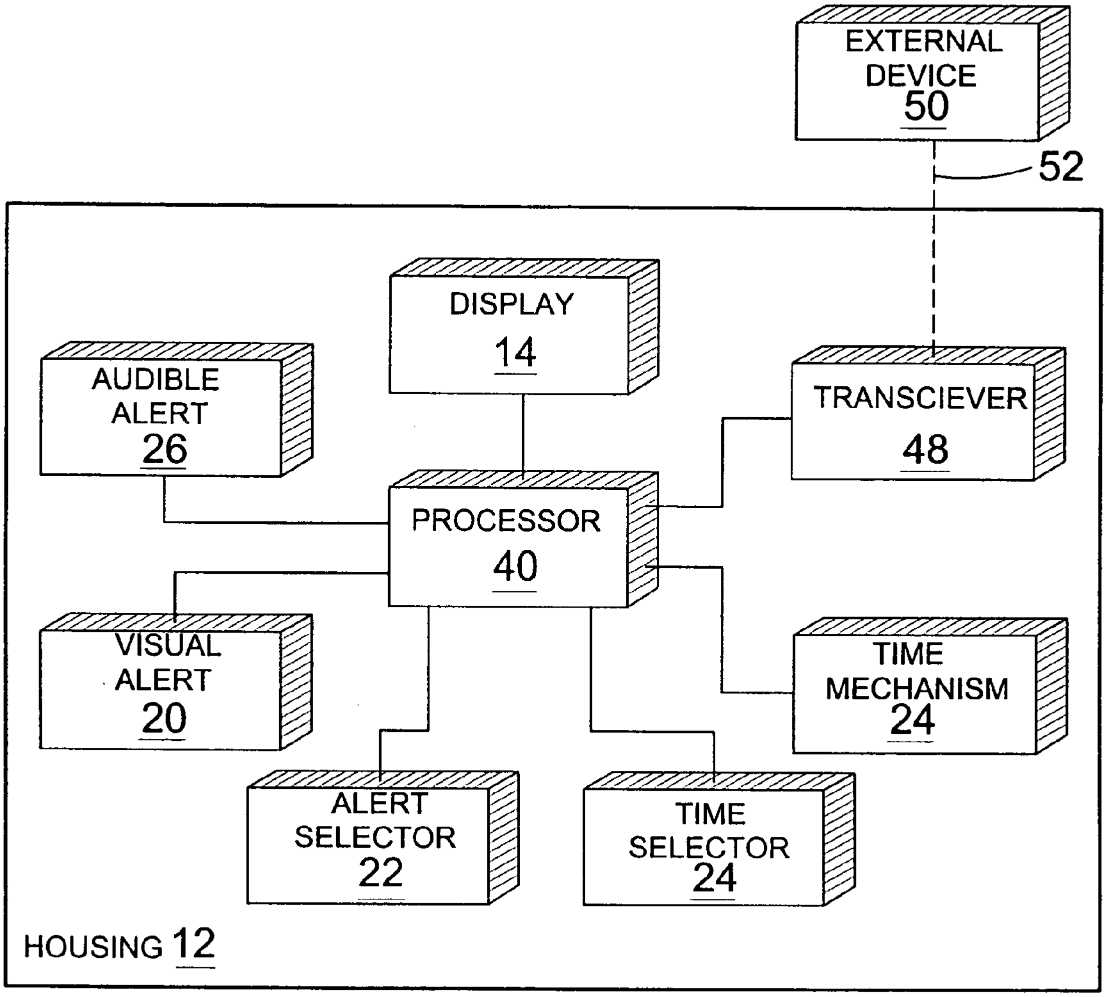
FIG. 9 is block diagram of an alternate embodiment of the alarm mechanism of the present invention.

FIG. 9 is block diagram of an alternate embodiment of the alarm mechanism of the present invention. The alarm 10 of the present invention includes a processor 40 positioned within the housing 12. The displays 14,16,18 are connected to the processor 40 which selectively controls what data is displayed on each respective display screen 14, 16, 18. The display screens are the clock display 14, the registration display 16 and the inspection display 18. A timing mechanism 42 is connected to the processor 40 for keeping time. Also connected to the processor 40 is the time selector 24, the alert selector 25, the audible alert 26 and the visual alert 20. The time selector 24 includes a month button and a year button for selectively changing the month and year displayed on the screens 16 and 18. The alarm mechanism 10 further includes a transceiver for selectively transmitting and receiving data 52. An external device 50 is able to selectively communicate with the alarm mechanism 10 by sending and receiving the data 52 therebetween.

The timing mechanism 42 provides the accurate date, month and year to the processor 40. When the users selectively programs at least one of the registration display 16 and the inspection display 18 to display a desired month and year, the timing mechanism 42 keeps track thereof. The user then selects the manner in which he/she I to be alerted when the programmed time/date equals the actual time/date using the alert selector 25. When the programmed time equals the actual time according to the mechanism 42, the processor 40 signals at least one of the audible alert 26 and the visual alert 20 to emit their respective alerts and notify the user that a programmed date/time is equal to the actual time/date thereby reminding the user to perform the desired event such as have the vehicle inspected or renewing the registration thereof.

A user is able also selectively program the alarm mechanism 10 using the external device 50. The external device is able to enter and change the desired date on which the event, either renewal of the registration or re-inspection of the vehicle, is to occur.

Figure 10:
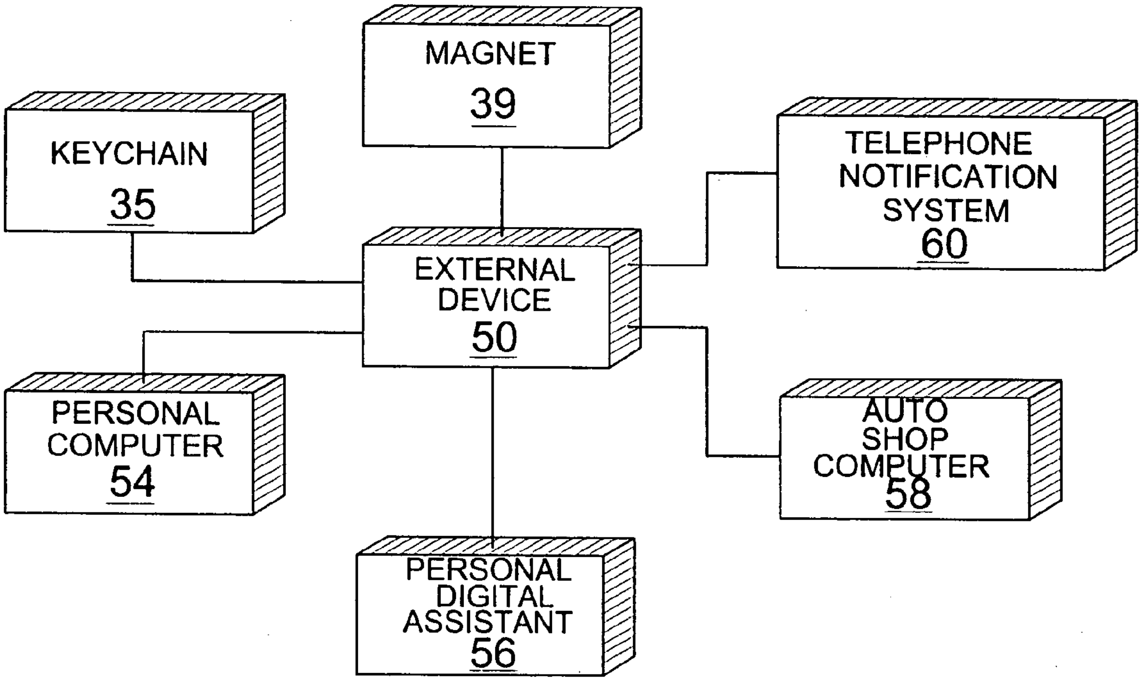
FIG. 10 is a block diagram of various external devices for use with the alarm mechanism of the present invention.

FIG. 10 is a block diagram of various external devices for use with the alarm mechanism of the present invention. The external device 50 is at least one of the keychain 35, the magnet 39, a personal computer 50, a personal digital assistant 56, a auto shop computer and a telephone notification system 60. The user can use the personal computer and personal digital assistant to program the desired date as well as to keep a record thereon for additional means of notification. For example, the programmed date can be stored in a calendar program such as Outlook® or Lotus Notes®.

Additionally, the alarm mechanism can selectively be connected to the telephone notification system 60 which interfaces with the alarm mechanism 10 and stores the programmed dates for each respective event therein. The telephone notification system 60 is then able to place an automated phone call to the user to notify them that the programmed date is equal to the actual date.

The auto-shop computer can also selectively interface with the alarm mechanism 10 so that when the vehicle is inspected and/or registered, that date is stored by the computer 60. The auto shop computer 60 is then able to selective program the alarm mechanism to notify the user on the desired date.

Figure 11:
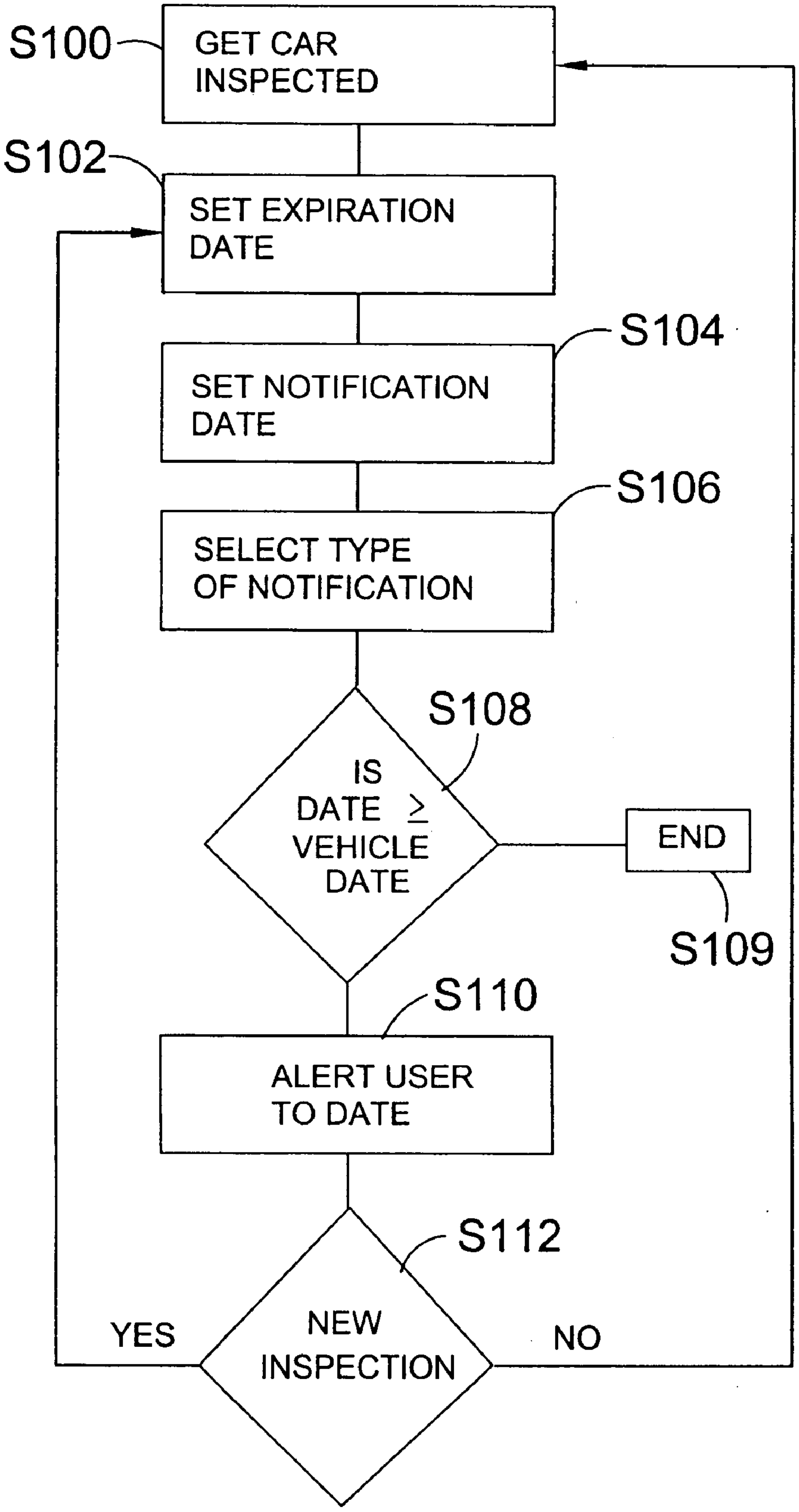
FIG. 11 is a flow diagram of the operation of the inspection alarm mechanism of the present invention.

FIG. 11 is a flow diagram of the operation of the inspection alarm mechanism of the present invention. The vehicle must first be inspected as shown in step S100. Thereafter, the expiration date of the inspection is programmed into the alarm mechanism as shown in step S102. Step S104 requires that the user program in a notification date in order to notify the user that the vehicles inspection is almost up. The user then selects the type and style of notification as shown in step S106. The alarm mechanism then inquires whether the actual date is greater than or equal to at least one of the expiration date and the notification date in step S108. If the date is not greater than or equal either date then the process ends as shown in step S109. If the actual date is greater than or equal to the programmed date, the user is alerted by at least one of the audible and visual alerts as shown in step S110. The car then must be re-inspected as shown in step 112. If there is a new inspection then the process returns to step S102 wherein the expiration date is re-programmed. If there is no new inspection, then the user must get the car inspected as shown in step S100 and reinitiates the process.

Figure 12:
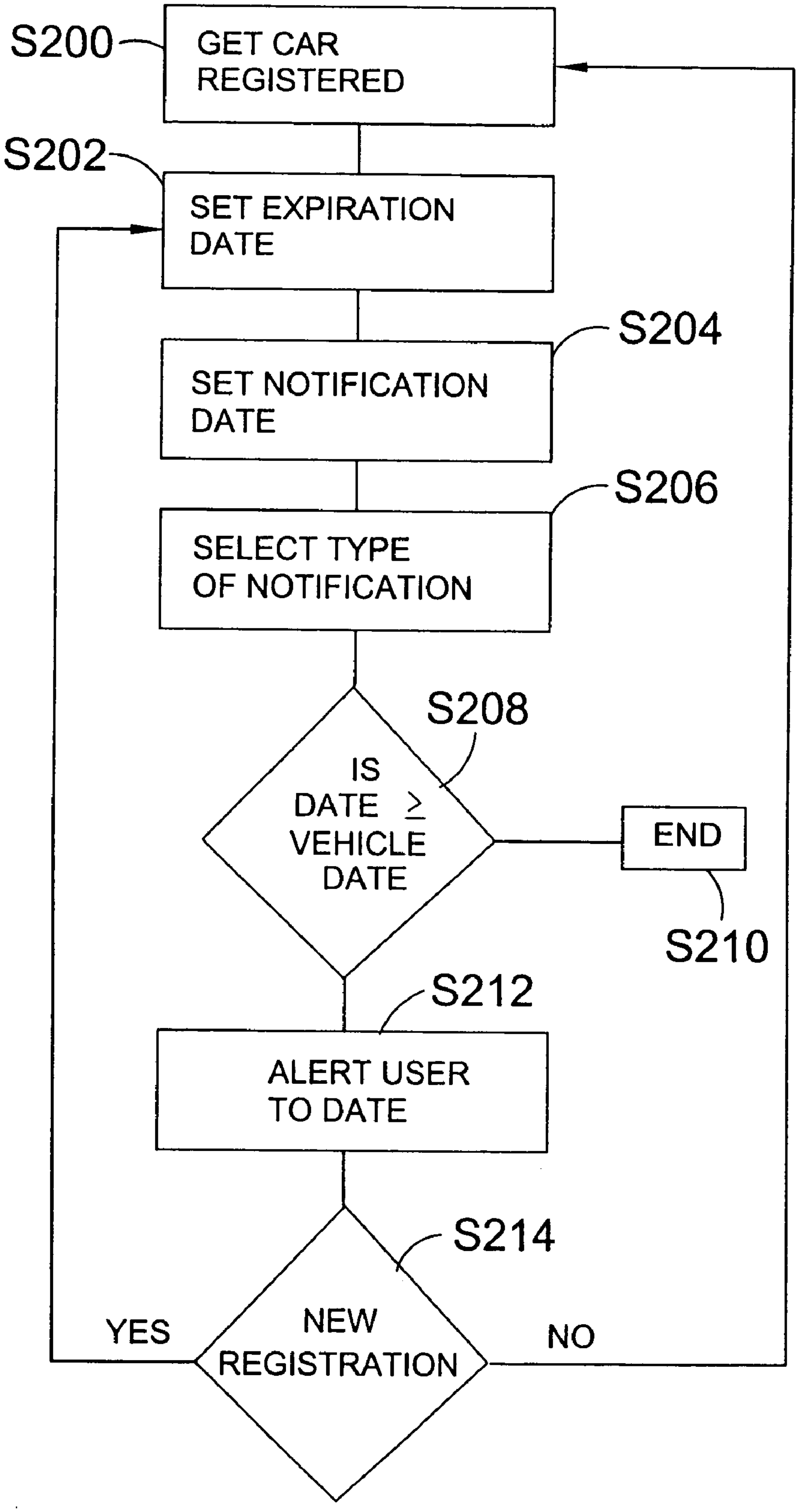
FIG. 12 is a flow diagram of the operation of the registration alarm mechanism of the present invention.

FIG. 12 is a flow diagram of the operation of the registration alarm mechanism of the present invention. The vehicle must first be registered as shown in step S200. Thereafter, the expiration date of the registration is programmed into the alarm mechanism as shown in step S202. Step S204 requires that the user program in a notification date in order to notify the user that the vehicles registration is almost up. The user then selects the type and style of notification as shown in step S206. The alarm mechanism then inquires whether the actual date is greater than or equal to at least one of the expiration date and the notification date in step S208. If the actual date is not greater than or equal to either date then the process ends as shown in step S210. If the actual date is greater than or equal to the programmed date, the user is alerted by at least one of the audible and visual alerts as shown in step S212. The car then must be re-registered as shown in step 214. If there is a new registration then the process returns to step S202 wherein the expiration date is re-programmed. If there is no new registration, then the user must get the car inspected as shown in step S200 and reinitiates the process.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. An alarm mechanism:

a) a first programming means for programming an expiration date signifying that an event must be performed;

b) a second programming means for programming a notification date for notifying a user that said event must be performed;

c) means for displaying said expiration date thereon;

d) a timing mechanism for producing an actual date connected to said first and second programming means;

e) a processor for comparing said actual date produced by said timing mechanism with each of said expiration date and notification date; and f) means for alerting a user that at least one of said expiration date and said notification date is greater than or equal to said actual date, wherein upon at least one of said expiration date and said notification date is greater than or equal to said actual date, said processor causes said alerting means to emit an alert thereby notifying the user that said event must be performed.

2. The alarm mechanism as recited in claim 1, wherein said alerting means is an audible alert for audibly emitting an alert to said user.

3. The alarm mechanism as recited in claim 2, wherein said audible alert is at least one of a musical alert, a pre-stored tone, and a verbal alert.

4. The alarm mechanism as recited in claim 1, wherein said alerting means is a visual alert for emitting a visual alert to said user.

5. The alarm mechanism as recited in claim 1, wherein said first and second programming means are able program a plurality of expiration and notification dates corresponding to a plurality of events.

6. The alarm mechanism as recited in claim 5, further comprising a plurality of display means corresponding to said plurality of events, wherein each respective display means displays said expiration date corresponding to the respective event.

7. The alarm mechanism as recited in claim 1, further comprising an alert selector that allows the user to selectively determine a type of alert emitted by said alerting means.

8. The alarm mechanism as recited in claim 1, wherein said first programming means include a month and year button for selectively changing the month and year of said expiration date.

9. The alarm mechanism as recited in claim 1, wherein said second programming means include a month and year button for selectively changing the month and year of said notification date.

10. The alarm mechanism as recited in claim 1, further comprising a transceiver for selectively communicating between said mechanism and an external device.

11. The alarm mechanism as recited in claim 10, wherein said external device is able to selectively program at least one of said expiration date and said notification date.

12. The alarm mechanism as recited in claim 11, wherein said external device is at least one of a personal computer, personal digital assistant and an auto-shop computer.

13. The alarm mechanism as recited in claim 12, wherein said external device transmits a data signal containing data representing at least one of said expiration date and said notification date for receipt by said transceiver.

14. The alarm mechanism as recited in claim 13, wherein said data signal is transmitted at least one of wirelessly or through a connection wire.

15. The alarm mechanism as recited in claim 1, wherein said mechanism is formed as a keychain.

16. The alarm mechanism as recited in claim 1, wherein said mechanism is formed integral with a dashboard of a vehicle.

17. The alarm mechanism as recited in claim 1, wherein said mechanism is formed as a refrigerator magnet.

18. The alarm mechanism as recited in claim 1, wherein said event is at least one of a vehicle inspection and a vehicle registration.

19. The alarm mechanism as recited in claim 1, further comprising a clock display for displaying a time thereon.

* * * * *